(12) United States Patent
Rosenberg (10) Patent No.: US 10,974,627 B2
(45) Date of Patent: Apr. 13, 2021

(54) METHOD FOR ADJUSTING A POSITION OF A VEHICLE SEAT

(71) Applicant: Volvo Car Corporation, Gothenburg (SE)

(72) Inventor: Johan Rosenberg, Lerum (SE)

(73) Assignee: Volvo Car Corporation, Gothenburg (SE)

(*) Notice: Subject to any disclaimer, the term of this patent is extended or adjusted under 35 U.S.C. 154(b) by 103 days.

(21) Appl. No.: 16/278,302

(22) Filed: Feb. 18, 2019

(65) Prior Publication Data

US 2019/0308534 A1 Oct. 10, 2019

(30) Foreign Application Priority Data

Apr. 10, 2018 (EP) .................................... 18166504

(51) Int. Cl.
*B60N 2/427* (2006.01)
*B60N 2/22* (2006.01)
(Continued)

(52) U.S. Cl.
CPC ........... *B60N 2/42745* (2013.01); *B60N 2/22* (2013.01); *B60N 2/34* (2013.01); *B60N 2/4221* (2013.01);
(Continued)

(58) Field of Classification Search
CPC .............. B60N 2/42745; B60N 2/4279; B60N 2/42727; B60N 2/688; B60N 2/34; B60N 2/42754; B60N 2/22; B60N 2/4221
(Continued)

(56) References Cited

U.S. PATENT DOCUMENTS

| 2001/0038233 A1* | 11/2001 | Eklind | ............... B60N 2/42736 |
| | | | 297/216.13 |
| 2003/0230919 A1* | 12/2003 | Park | ................... B60N 2/42763 |
| | | | 297/344.1 |

(Continued)

FOREIGN PATENT DOCUMENTS

| DE | 102005007428 A1 * | 8/2006 | ......... B60N 2/42709 |
| DE | 102005007428 A1 | 8/2006 | |

(Continued)

OTHER PUBLICATIONS

Machine Translation of DE-102005007428-A1 (Year: 2005).*
Sep. 24, 2018 European Search Report issue on International Application No. EP18166504.

*Primary Examiner* — James A English
*Assistant Examiner* — Kurtis Nielson
(74) *Attorney, Agent, or Firm* — Clements Bernard Walker; Christopher L. Bernard (57) ABSTRACT

A method for adjusting a position of a vehicle seat from a reclined position to a pre-determinable safety position. The method includes detecting an imminent or ongoing frontal or semi-frontal collision, pretensioning a seat belt associated with the vehicle seat, the seat belt being directly or indirectly attached to a backrest of the vehicle seat, and adjusting the position of the vehicle seat from the reclined position to the pre-determinable safety position by means of a seat adjustment means associated with the vehicle seat, the seat adjustment means being actuated by a collision force generated by the imminent or ongoing frontal or semi-frontal collision and applied via a seat occupant and/or the seat belt to the vehicle seat. The present invention also relates to an occupant safety arrangement for a vehicle seat.

14 Claims, 4 Drawing Sheets

(51) Int. Cl.
  *B60N 2/68* (2006.01)
  *B60N 2/34* (2006.01)
  *B60N 2/42* (2006.01)

(52) U.S. Cl.
  CPC ....... *B60N 2/4279* (2013.01); *B60N 2/42727* (2013.01); *B60N 2/42754* (2013.01); *B60N 2/42781* (2013.01); *B60N 2/688* (2013.01)

(58) Field of Classification Search
  USPC ........................................................ 280/271
  See application file for complete search history.

(56) References Cited

U.S. PATENT DOCUMENTS

| | | | | |
|---|---|---|---|---|
| 2006/0055214 A1* | 3/2006 | Serber | ................. | B60N 2/1846 297/216.1 |
| 2007/0107969 A1* | 5/2007 | Ootani | .................. | B60N 2/067 180/282 |
| 2007/0170770 A1* | 7/2007 | Behrens | .................. | B60N 2/22 297/476 |
| 2010/0001559 A1* | 1/2010 | Masutani | ................ | B60R 22/26 297/216.1 |
| 2010/0019555 A1* | 1/2010 | Feng | .................... | B60N 2/4279 297/216.19 |
| 2010/0280718 A1* | 11/2010 | Hashimoto | .......... | B60N 2/0276 701/45 |
| 2011/0098893 A1* | 4/2011 | Hashimoto | ........ | B60N 2/42745 701/46 |
| 2011/0227378 A1* | 9/2011 | Swierczewski | .... | B60N 2/42754 297/216.15 |
| 2012/0109468 A1* | 5/2012 | Baumann | ............... | B60R 21/207 701/45 |
| 2016/0129879 A1* | 5/2016 | Harda | ..................... | B60R 21/01 297/216.13 |
| 2016/0288751 A1* | 10/2016 | Stancato | ........... | B60R 21/01554 |
| 2016/0325641 A1* | 11/2016 | Ohno | .................... | B60R 21/207 |
| 2017/0008480 A1* | 1/2017 | Ohno | ....................... | B60N 2/99 |
| 2019/0118681 A1* | 4/2019 | Daniel | ................... | B60N 2/433 |
| 2019/0241141 A1* | 8/2019 | Sirous | ................... | B60R 21/232 |

FOREIGN PATENT DOCUMENTS

| | | | | |
|---|---|---|---|---|
| DE | 102006003651 A1 * | 8/2007 | ............ | B60N 2/22 |
| DE | 102007032524 A1 * | 1/2009 | ............ | B60N 2/045 |
| DE | 102007032524 A1 | 1/2009 | | |
| DE | 102011122393 A1 | 9/2012 | | |
| DE | 102016213071 A1 | 1/2018 | | |
| DE | 102018202455 A1 * | 8/2019 | ........... | B60N 2/0276 |
| WO | 2007128850 A1 | 11/2007 | | |

* cited by examiner

METHOD FOR ADJUSTING A POSITION OF A VEHICLE SEAT

CROSS-REFERENCE TO RELATED APPLICATION

The present patent application/patent claims the benefit of priority of co-pending European Patent Application No. 18166504.3, filed on Apr. 10, 2018, and entitled "METHOD FOR ADJUSTING A POSITION OF A VEHICLE SEAT," the contents of which are incorporated in full by reference herein.

TECHNICAL FIELD

The present invention relates to a method for adjusting a position of a vehicle seat from a reclined position to a pre-determinable safety position. The present invention further relates to an occupant safety arrangement for a vehicle seat.

BACKGROUND ART

With the purpose of ameliorating and/or preventing injuries to occupants of a vehicle in case the vehicle is involved in a collision, the vehicle is commonly equipped with several safety systems, such as seat belts and airbags. The positive effect of seat belt use and air bag deployment benefits from good timing in the activation of the systems as well as that the occupant, and thus the vehicle seat, is in a position for which the safety systems are set to give as good protection as possible.

However, occupants may make comfort adjustments to the position of the vehicle seat freely within a certain range, even to such an extent that the position is not in the optimal range for the safety systems to work properly. In some prior art solutions, in case of a detected imminent collision, active means—for example pyrotechnic devices and electrical engines—are triggered that try to achieve a displacement of at least parts of the seat into a position that will improve the function of the safety systems. However, depending on how far "out-of-position" the occupant is situated, meaning how far from a desirable safety position the occupant is situated, the active means may not be fast enough to move the seat to an appropriate position from a safety system point of view. Further, such active means make up rather complicated and expensive systems including a plurality of parts and requiring space and time to be installed. Also, as mentioned above, the active means may not function fast enough to move the occupant into an appropriate position for the safety system to work in time for the collision.

With the introduction of vehicles with AD capabilities, i.e. autonomous drive capabilities, there is a potential for the occupants to move and adjust the vehicle seat even more freely than is possible today. In particular, a more reclined position than allowed today may be desirable, or at least more frequently used, in particular by a driver of the vehicle when the vehicle is driving autonomously.

As such, there is a desire for further improvements in assuring that a vehicle seat is in a safety position, in case the vehicle is involved in a collision, such that the safety systems can work appropriately to protect the seated occupant.

SUMMARY

The object of the present invention is to overcome or ameliorate at least one of the disadvantages of the prior art, or to provide a useful alternative.

The object of the present invention is to provide an improved method for adjusting a position of a vehicle seat in case the vehicle is involved in a collision.

The present invention relates to a method for adjusting a position of a vehicle seat from a reclined position to a pre-determinable safety position. The method includes:
  detecting an imminent or ongoing frontal or semi-frontal collision,
  pretensioning a seat belt associated with the vehicle seat, the seat belt being directly or indirectly attached to a backrest of the vehicle seat, and
  adjusting the position of the vehicle seat from the reclined position to the pre-determinable safety position by means of a seat adjustment means associated with the vehicle seat, the seat adjustment means being actuated by a collision force generated by the imminent or ongoing frontal or semi-frontal collision and applied via a seat occupant and/or the seat belt to the vehicle seat.

A method as recited above implies that upon that the vehicle is involved in a collision, an adjustment of the position of the vehicle seat is carried out by utilizing the collision force generated by the collision itself. Thus, an advantage being that the initial part of the acceleration pulse generated by the collision is used for actuating the displacement of the seat. This has the positive effect that the adjustment is carried out fast, i.e. such that a safety position of the seat is achieved within a time period for the seated occupant to be able to interact with airbag(s) as intended. There is a minimum adverse effect on the occupant by avoiding stress due to positioning means. A further positive effect is that the method is independent of active means such as pyrotechnical devises and/or electrical motors to operate the adjustment of the position of the seat.

Thereby, the seat adjustment means may be a passive mechanical means adapted to be actuated by an external force. Hence, the adjustment means operate mechanically. No active elements are required to perform the adjustment of the position of the seat.

As described herein, the collision is defined as being frontal or semi-frontal, i.e. it has at least a frontal component. Hence, it may involve a full frontal collision or a semi-frontal collision of various degrees. Consequently, it involves a main direction of collision which will urge a movement of the driver in a main forward direction relative to the vehicle interior.

The directions used herein relate to known extensions and directions of a vehicle assuming it is standing on flat ground. As such, the vehicle extends in a longitudinal direction, a lateral direction and a height direction, which directions are perpendicular to each other. The longitudinal direction is the normal driving direction of the vehicle. The lateral direction is a cross direction of the vehicle.

The term "pre-determinable safety position" as used herein is a position suitable for safety means to operate in. It implies an upright sitting posture of the occupant facing forward in the longitudinal direction of the vehicle. As a non-limiting example, the backrest may in a pre-determinable safety position be inclined at an angle with respect to the height direction of the vehicle in the range from −15 to 30 degrees, preferably from 0 to 25 degrees, more preferably from 10 to 20 degrees.

The term "reclined position" as used herein implies, contrary to the safety position, a "lying-down" or resting posture of the seated occupant. As a non-limiting example, the backrest may in a reclined position be reclined at an angle with respect to the height direction of the vehicle in the range of from 30 to 75 degrees, preferably from 35 to 65 degrees, more preferably from 40 to 55 degrees. The seat cushion may in the reclined position be less inclined with respect to the longitudinal direction of the vehicle than in the pre-determinable safety position. The cushion may be inclined by an angle of at least 10 degrees with respect to the longitudinal direction of the vehicle or at least 15 degrees with respect to the longitudinal direction of the vehicle.

A seated occupant in a reclined position of the seat poses the risk of submarining the seat belt at a collision instance, since the "lying-down" posture and relatively flat seat cushion do not provide enough restraint on the hip of the occupant to retain the occupant in the seat. Further, having reclined the backrest significantly positions the upper body of the occupant far from a desirable position for a best performance interaction with the restraint system, i.e. seat belt and airbag(s), and thus reduces the protective effect of the restraint systems.

The pretensioning of the seat belt may initiate the activation of the seat adjustment means. This implies that the adjustment means are adapted to be actuated for any detected imminent or ongoing semi-frontal or frontal collision which results in triggering of the pre-tensioning of the seat belt.

Optionally, or as a complement, the method as described herein may include triggering of a release mechanism for the adjustment means. The release mechanism may be triggered by the detection of an imminent or on-going semi-frontal or frontal collision or by the pre-tensioning of the seat belt. The purpose of a release mechanism would be to secure that the adjustment means are activatable only by a force generated by an actual collision and/or following pre-tensioning of the seat belt. It may be stipulated that there may be situations invoked by seated occupant otherwise, in which the seat adjustment means, being actuated by force, are actuated undesirably. A release mechanism as described herein may include, for example, a pyrotechnical release or an electro-mechanical solenoid actuator. The release mechanism may be triggered at a predefinable force limit. For example, a pulling force from the upper belt portion of the seat belt on the seat in a range of from 500 to 2000 Newton, may be used as a range for a predefinable force limit. Another example, a downward/forward force on the cushion of the seat in a range of from 1000 to 2000 Newton may be used as a range for a predefinable force limit for triggering of the release mechanism.

The vehicle seat may include a cushion and the backrest previously mentioned. The seat adjustment means may include a cushion adjustment means being adapted to adjust a position of the cushion, and/or a backrest adjustment means being adapted to adjust a position of the backrest.

The step of adjusting may include:
(a) increasing an inclination of at least a part of the cushion, with respect to the reclined position and/or the position of the backrest by means of the cushion adjustment means being actuated by the collision force applied via the seat occupant to the cushion, and/or
(b) tilting the backrest forward by means of the backrest adjustment means being actuated by the collision force applied via the seat belt directly or indirectly attached to the backrest.

Step (a) as recited above implies that increasing the inclination of the cushion restrains the hip of the occupant to the seat. This has the positive effect of reducing the risk of the occupant submarining the seat belt.

Step (a) may include increasing the inclination of the at least a portion of the cushion with respect to the reclined position by an angular displacement in the range from 10° to 55°, preferably from 15° to 50°, more preferably from 15° to 45°, most preferably from 15° to 40°.

The cushion may include a front end portion and a rear end portion.

Step (a) may include increasing the inclination of at least a portion of the cushion by moving the rear end portion of the cushion downwards in relation to the front end portion of the cushion. Optionally and alternatively, step (a) may include increasing the inclination of the at least a portion of the cushion by displacing the cushion forwards and the front end portion of the seat cushion upwards.

Step (b) may include tilting the backrest forward by an angular displacement in the range from 20° to 75°, preferably from 30° to 75°, more preferably from 40° to 75°, most preferably from 45° to 75°, intended to bring the seated occupant from the reclined position to the pre-determinable safety position.

The method may include controlling the adjustment from the reclined position to the pre-determinable safety position by means of a force element having a progressive characteristic. As the seated occupant during the adjustment procedure is gaining a more desirable position, i.e. approaches a pre-determinable safety position, the seated occupant is able to take more loads. Therefore, the restraining of the seated occupant may be increased, by allowing higher loads in the force element(s) in the backrest. In this way, also a more smooth transition to a belt force load limiter force may be achieved. For the cushion adjustment a progressive force may potentially be needed to avoid a hard strike through when the adjustment procedure reaches its final position, i.e. the pre-determinable safety position. In other words, a force element with a progressive characteristic implies in this context that a higher adjustment force will be allowed the closer the position of the vehicle seat to the pre-determinable safety position.

Step (a) and step (b) may be carried out at least partly simultaneously and/or independently of each other.

Step (a) and step (b) may be performed sequentially, thus step (a) is followed by step (b).

Step (a) may be carried out, at least to some extent, prior to step (b). As a complement, when step (b) is carried out, the angle between the cushion and the backrest may be kept fixed, such that when the backrest is tilted forward the angle to the cushion is kept constant. As an alternative, the angle between the cushion and backrest is not kept fixed. Hence, as step (b) is carried out, the angle between the cushion and backrest decreases.

Optionally, the method may include displacing the cushion and/or backrest forward along the longitudinal direction of the vehicle as a complement to step (a) and/or (b).

A method as described herein may be performed at least partly by an occupant safety arrangement, e. g. as described herein.

The present invention further relates to an occupant safety arrangement. The occupant safety arrangement includes a seat belt which is adapted to be directly or indirectly attached to a backrest of the vehicle seat. The arrangement further includes a seat adjustment means, adapted to adjust a position of the vehicle seat. The seat adjustment means is adapted to adjust the position of the vehicle seat from a reclined position to a pre-determinable safety position. The seat adjustment means is configured to be actuated by a collision force, generated by a frontal or semi-frontal collision, and applied via a seat occupant and/or via the seat belt to the vehicle seat.

The seat adjustment means may include or be constituted by a passive mechanical means adapted to be actuated by an external force. An external force is generated by the vehicle being involved in a collision. A passive mechanical means may for example include mechanical linkage arrangements, guide rail arrangements, and/or other mechanical elements such as force elements, for example force deformation elements or force tearing elements. As a non-limiting example, a torsion bar may connect the backrest to cushion or to a seat base structure. As another non-limiting example, the cushion motion may be controlled in height by a rail- or a hinge-solution, whereby the movement is controlled by a force deformation or tearing element.

The vehicle seat may include a cushion and the backrest as mentioned above. The seat adjustment means may include a cushion adjustment means, being adapted to adjust a position of the cushion, and/or a backrest adjustment means, being adapted to adjust a position of the backrest.

The cushion adjustment means may be configured to increase the inclination of at least a portion of the cushion, with respect to the reclined position and/or a position of the backrest, being actuated by the collision force applied via the seat occupant to the cushion.

The backrest adjustment means may be configured to tilt the backrest forwards being actuated by the collision force applied via the seat belt to the backrest. That is, intended to bring the seat occupant to the pre-determinable safety position.

The cushion adjustment means and the backrest adjustment means may be configured to operate at least partly simultaneously and/or independently of each other, as described previously.

The cushion may include a front end portion and rear end portion.

As a non-limiting example, the cushion adjustment means may include a mechanical linkage device and being configured to, being actuated by the collision force applied via a seat occupant on the seat cushion, move the rear end portion of the seat cushion downwards in relation to the front end portion of the seat cushion.

As another non-limiting example, the cushion adjustment means may include a guide rail arrangement configured to, being actuated by the collision force applied via the seat occupant on the seat cushion, displace the seat cushion forwards and the front end portion of the seat cushion upwards.

The occupant safety arrangement may include a release mechanism as previously described.

The method as described herein may be performed by a system, e.g. as described herein.

The present invention also relates to a system for adjusting a position of a vehicle seat from a reclined position to a pre-determinable position. The system is adapted to:
 detect an imminent or ongoing frontal or semi-frontal collision,
 pretension a seat belt associated with the vehicle seat, the seat belt being directly or indirectly attached to a backrest of the vehicle seat, and
 adjust the position of the vehicle seat from the reclined position to the pre-determinable safety position by means of a seat adjustment means associated with the vehicle seat, the seat adjustment means being actuated by an collision force generated by the imminent or ongoing frontal or semi-frontal collision and applied via a seat occupant and/or the seat belt to the vehicle seat.

Optionally, the system may include one or more of:
 a receiving unit being adapted to obtain information of a detected imminent or ongoing frontal or semi-frontal collision,
 a control unit being adapted to trigger pretensioning of the seat belt, in case an imminent or ongoing semi-frontal or frontal collision is detected, and
 an occupant safety arrangement as described herein.

The present invention also relates to a vehicle, such as a passenger car, including an occupant safety arrangement as described herein and/or a system as described herein.

BRIEF DESCRIPTION OF THE DRAWINGS

The present invention will hereinafter be further explained by means of non-limiting examples with reference to the appended drawings wherein.

It should be noted that the appended drawings are schematic and that individual components are not necessarily drawn to scale and that the dimensions of some features of the present invention may have been exaggerated for the sake of clarity.

DESCRIPTION OF EMBODIMENTS

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

The present invention and its advantage over the prior art will be further explained with reference to FIGS. 1-4. Directions as used herein relate to known extensions and directions of a vehicle. As such, the vehicle extends in a longitudinal direction X, a lateral direction and a height direction Z, which directions are perpendicular to each other, see FIGS. 1a and 1b. The longitudinal direction X is the normal driving direction of the vehicle. The lateral direction is a cross direction of the vehicle and thus not illustrated.

Figure 1A:
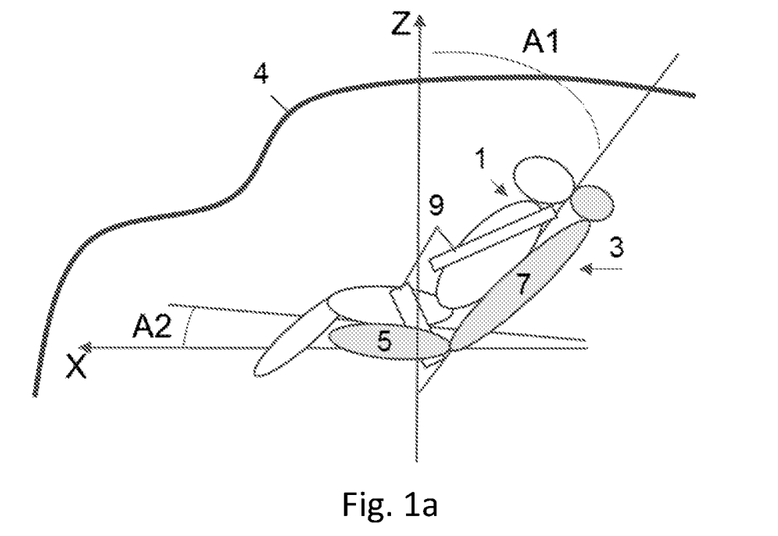
FIG. 1a illustrates a reclined position of a vehicle seat including an occupant safety arrangement according to the present invention.
Figure 1B:
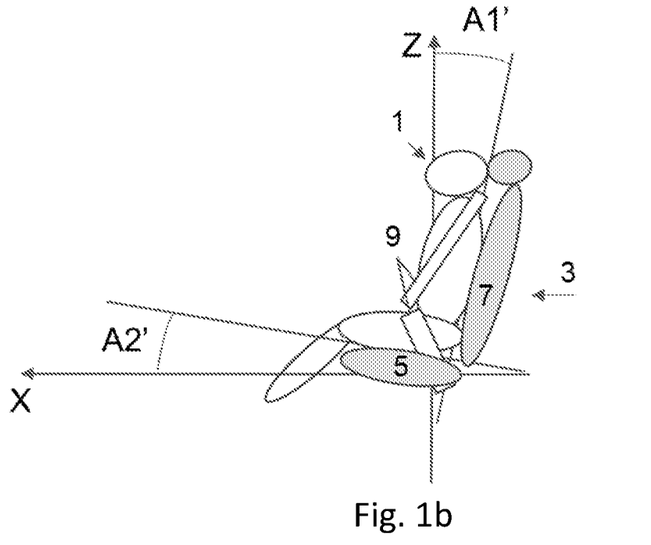
FIG. 1b illustrates a pre-determinable safety position of the vehicle seat.

FIGS. 1a and 1b schematically illustrate an occupant 1 seated in a vehicle front seat 3 of a vehicle 4 in two different seating positions. The vehicle 4 is only schematically depicted in FIG. 1a. The vehicle front seat 3 includes a cushion 5 for the occupant 1 to sit on and a backrest 7 for the occupant 1 to rest the back against when seated in the seat 3 facing forward in the longitudinal direction X of the vehicle 4. The occupant 1 is retained by a seat belt 9. The seat belt 9 includes a lap belt portion and an upper belt portion. The upper belt portion of the seat belt 9 is attached directly or indirectly to the backrest 7 of the seat 3. The vehicle 4 is assumed to be equipped with frontal airbags, e.g. located in a steering wheel and/or in a dashboard of the vehicle, that is intended to work in cooperation with the seat belt 9 to protect the occupant 1 in case the vehicle 4 is involved in a collision.

The vehicle 4, in which the occupant 1 is assumed seated, is assumed going at a steady velocity during normal driving, for example AD. FIG. 1a schematically illustrates the occupant 1 seated in a vehicle front seat 3 in a reclined position. The occupant 1 can be a passenger in any of the vehicle seating positions or a driver of the vehicle 4. In the latter case, the vehicle may be assumed to be driving autonomously, since in the reclined position a driver will, inter alia, have difficulty reaching the steering wheel and pedals of the vehicle. From a crash safety point of view, a reclined position, as described herein, is undesirable and may significantly reduce the protective effect of the restraint systems in case the vehicle is involved in a collision.

A reclined position as used herein, involves the backrest 7 of the vehicle front seat 3 to be reclined so as to provide a "lying-down" or resting position of the seated occupant 1. It is thus markedly different from, for example, an upright driving position of the seated occupant 1 and thus of the vehicle front seat 3. The backrest 7 is reclined so as to form an angle A1 with respect to the height direction Z of the vehicle 4. The angle A1 may be in the range from 30° to 75°. Thereto, the cushion 5 is inclined with respect to the longitudinal direction X of the vehicle 4 so as to form an angle A2 with respect to the longitudinal direction X. The angle A2 may be at least 10° or at least 15°. Thereby, the reclined position renders the occupant 1 to be in an extreme out-of-position with respect to a preferred position for which the restraint systems, such as a seat belt and airbags, may provide their best protective performance in case the vehicle 4 is involved in a collision. If the vehicle 4 is involved in a collision, and the occupant 1 is in a reclined position, as illustrated in FIG. 1a, there is a potential risk that the occupant 1 will submarine or underride the seat belt 9. This is due to the difficulty for the seat belt 9 to retain the hip of the occupant 1 in the seat 3. Further, the cooperative protective effect of the seat belt 9 and airbags may be reduced markedly for the occupant 1 in the reclined position since the occupant 1 is not in a position where the airbag deployment can work as intended together with the seat belt 9.

FIG. 1b schematically illustrates a preferred safety position of an occupant 1 seated in a vehicle front seat 3. This position represents a pre-determinable safety position as used herein. The occupant 1 is in an upright position as compared to in the reclined position illustrated in FIG. 1a. Hence, the angle A1' of the backrest 7 with respect to the height direction Z of the vehicle is significantly smaller than in the reclined position. Further, the cushion 5 is typically at a larger angle A2' to the longitudinal direction X than in the reclined position. The preferred upright safety position of the occupant 1 is thus characterized by that the hip angle of the occupant is markedly smaller than in the reclined position of the occupant 1. The hip angle in this context refers to the angle between the upper and lower part of the body of the occupant at the level of the hips. From a crash safety point of view, a desired pre-determinable safety position of a seated occupant 1 represents a seating position in which the seat belt 9 and airbags are intended to work cooperatively at their best to give as good protection as possible. For the person skilled in the art, it is known from prior art how to determine such a pre-determinable safety position.

Figure 2A:
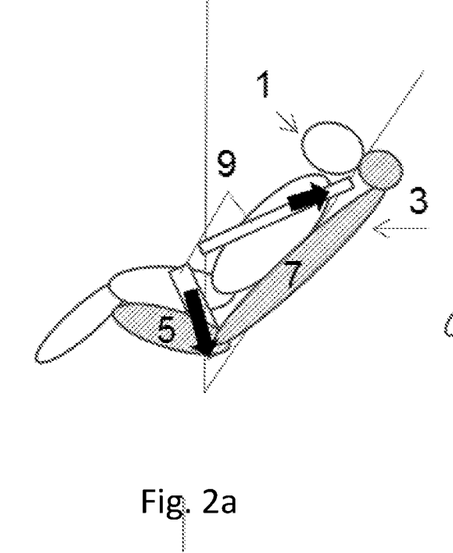
FIGS. 2a-2d illustrate a frontal collision scenario.
Figure 2B:
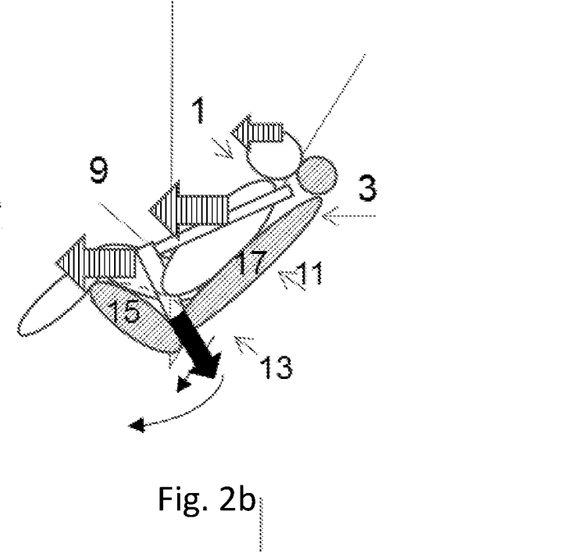
Figure 2C:
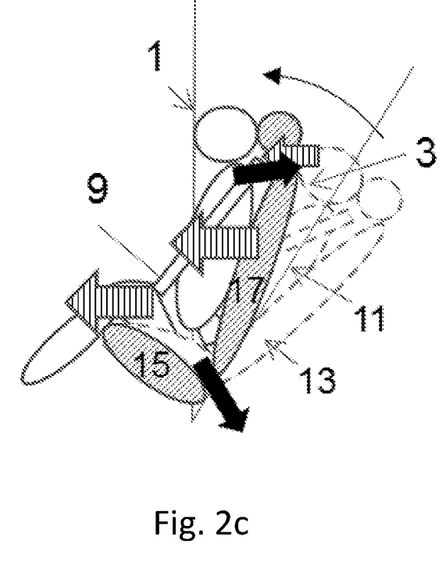
Figure 2D:
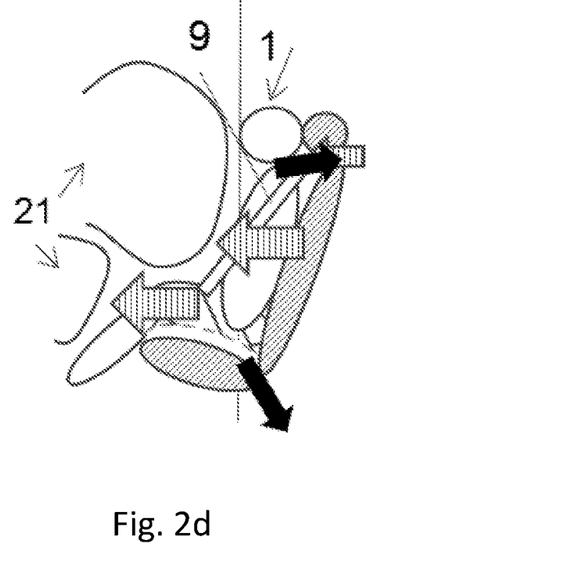

With reference to FIGS. 2a to 2d and FIG. 3, a method and an arrangement 11 according to the present invention will be described. The same directions and reference numbers apply as for already depicted features in FIGS. 1a and 1b, and may thus not be repeated as the same features appear again in FIGS. 2a to 2d. An occupant 1 is in FIG. 2a illustrated as seated in a reclined position in a vehicle front seat 3 and retained by a seat belt 9 as described above with reference to FIG. 1a. The seat belt 9 includes an upper belt portion that is attached directly or indirectly to the backrest 7. If an imminent or ongoing frontal or semi-frontal collision is detected, the seat belt 9 associated with the vehicle front seat 3 is activated such that pretensioning of the seat belt 9 is triggered. This is illustrated in FIG. 2a by the filled black arrows extending in the directions of the seat belt 9 portions. Further, as illustrated in FIGS. 2b to 2d, the vehicle seat 3 is adjusted from the reclined position to the pre-determinable safety position by means of seat adjustment means 13 associated with the vehicle seat 1. The seat adjustment means 13 are actuated by the collision force generated by the imminent or ongoing frontal or semi-frontal collision and applied via the seat occupant 1 and/or seat belt 9 to the vehicle seat 3.

Hence, the method and arrangement 11 utilize that the vehicle 4 is affected by acceleration due to the collision. This has the advantage that the initial part of the acceleration pulse due to the collision is used for actuating the adjustment of the vehicle seat 1 from a reclined position to a pre-determinable safety position. In other words, the actuation of the seat adjustment means 13 may be described as being directly or indirectly body-weight driven at the collision instance, thus being independent of any other forces, generated by active means, to actuate the adjustment of the position of the vehicle seat 3.

Figure 3:
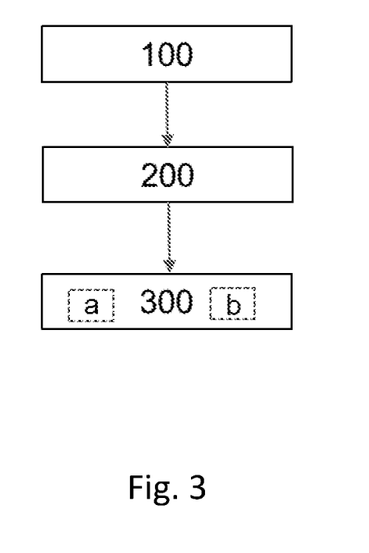
FIG. 3 illustrates a method according to the present invention.

FIG. 3 illustrates a method for adjusting a position of a vehicle seat 3 from a reclined position to a pre-determinable safety position according to the present invention. See also FIGS. 2a to 2d for reference. The method includes:

100: detecting an imminent or ongoing frontal or semi-frontal collision,

200: pretensioning a seat belt 9 associated with the vehicle seat 3, the seat belt 9 being directly or indirectly attached to a backrest 7 of the vehicle seat 3, and

300: adjusting the position of the vehicle seat 3 from the reclined position to the pre-determinable safety position by means of a seat adjustment means 13 associated with the vehicle seat 3, the seat adjustment means 13 being actuated by an collision force generated by the imminent or ongoing frontal or semi-frontal collision and applied via a seat occupant 1 and/or the seat belt 9 to the vehicle seat 3.

Thereby, the seat adjustment means 13 may be a passive mechanical means, i.e. a mechanical means adapted to be actuated by an external force. Hence, the adjustment means 13 operate mechanically. Thus, no active elements are required to perform the adjustment of the position of the vehicle seat 3.

As illustrated in FIGS. 2b and 2c, the seat adjustment means 13 includes a cushion adjustment means 15 being adapted to adjust the position of the cushion 5 and a backrest adjustment means 17 being adapted to adjust the position of the backrest 7. In embodiments of the present invention, the seat adjustment means may include cushion adjustment means and/or backrest adjustment means as described herein.

With reference to FIG. 3, step 300 of the method as described herein, may include:

(a) increasing the inclination of at least a portion of the cushion 5, with respect to the reclined position and/or the position of the backrest 7 by means of the cushion adjustment means 15 being actuated by the collision force applied via the seat occupant 1 to the cushion 5, see FIG. 2*b*, and/or (b) tilting the backrest 7 forward by means of the backrest adjustment means 17 being actuated by the collision force applied via the seat belt 9 to the backrest 7, see FIG. 2*c*.

Step (a) may include increasing the inclination of at least a portion of the cushion 5 with respect to the reclined position by an angular displacement in the range from 10° to 55°, preferably from 15° to 50°, more preferably from 15° to 45°, most preferably from 15° to 40°.

The cushion 5 of the vehicle seat 3 may include a front end portion and a rear end portion. In this case, in an embodiment of the present invention step (a) includes increasing the inclination of at least a portion of the cushion 5 by moving the rear end portion of the cushion 5 downwards in relation to the front end portion of the cushion 5. As an alternative or complement, step (a) includes increasing the inclination of at least a portion of the cushion 5 by displacing said cushion 5 forward and the front end portion of the seat cushion 5 upwards.

Step (b) may include tilting the backrest 7 forward by an angular displacement in the range of from 20° to 75°, preferably from 30° to 75°, more preferably from 40° to 75°, most preferably from 45° to 75°.

Step (a) and (b) may be carried out or begin at least partly simultaneously and/or independently of each other. By way of example, when step (b) is carried out, the angle between the cushion 5 and the backrest 7 is being kept fixed, such that when the backrest 7 is tilted forward, the angle with respect to the cushion 5 is kept constant. As an alternative, the angle between the cushion 5 and backrest 7 is not kept fixed. Hence, as step b is carried out, the angle between the cushion and backrest decreases.

In FIGS. 2*c* and 2*d*, step (a) and step (b) are illustrated as being performed sequentially, thus step (a) is followed by step (b). Further, as illustrated, the position of the cushion 5 is kept fixed as the tilting of the backrest 7 forward is performed in step (b).

Figure 4A:
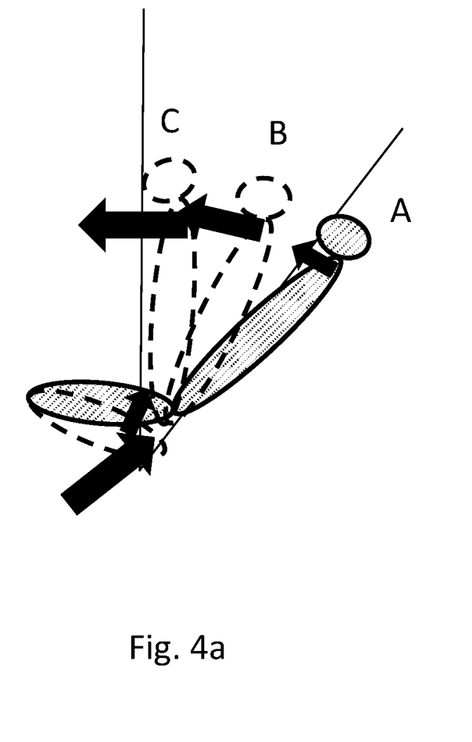
FIG. 4a illustrates an adjustment scenario of the position of the vehicle seat.
Figure 4B:
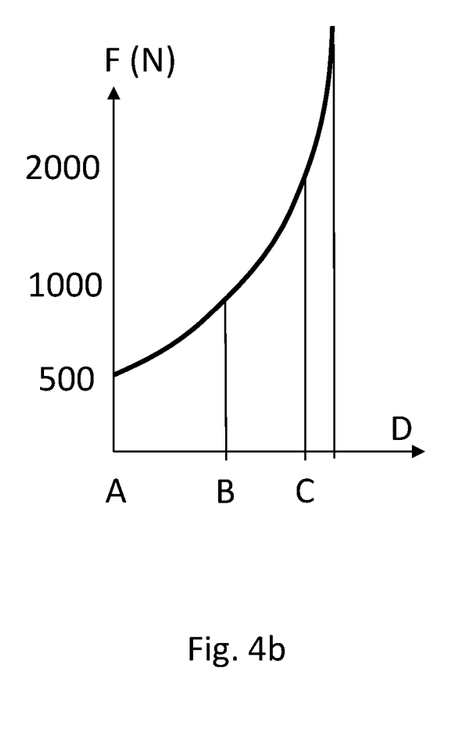
FIG. 4b illustrates a seat adjustment force characteristic for the adjustment.

The method may include controlling the adjustment from the reclined position to the pre-determinable safety position by means of a force element having a progressive characteristic. With reference to FIG. 4*a*, as the seated occupant during the adjustment procedure is gaining a more desirable position, the seated occupant is able to take more loads. Therefore, the restraining may be increased by higher loads in the force element(s) in the backrest. This is illustrated in FIG. 4*b* by the adjustment force (F)—displacement (D) curve and the schematic illustration of three positions A, B and C of the seat in the adjustment process in FIG. 4*a*. The increase in force is illustrated by the successively larger filled arrows at the different positions. In this way, also a more smooth transition to a belt force load limiter force may be achieved. For the cushion adjustment a progressive force is potentially needed to avoid a hard strike through when the adjustment reaches its final position, i.e. the pre-determinable safety position, also illustrated by the increase in adjustment force as the inclination of the cushion progresses.

Returning to FIGS. 2*a* to 2*d*, in FIG. 2*a* the pretensioning of the seat belt 9 is indicated by the arrows along the extension of the seat belt 9 portions as previously mentioned. Thus, an imminent or ongoing semi-frontal or frontal collision has been detected which has triggered the pretensioning. In embodiments of the present invention, the pretensioning initiates the actuation of the seat adjustment means 11, see FIG. 2*b*. However, the method according to the present invention may also include the triggering of a release mechanism of the seat adjustment means 11. In this case, triggering the release mechanism will set the adjustment means 11 in a state where it is able to actuate the adjustment of the position of the vehicle seat 3 when affected by the external force via the seated occupant 1 and/or the seat belt 9.

As described above, with reference to FIGS. 2*b* and 2*c*, the adjustment of the position of the vehicle seat 3 from the reclined position to a pre-determinable safety position is disclosed. The striped arrows extending in a direction away from the occupant's body along the longitudinal direction X illustrate the state of the occupant 1 striving to continue to move forward at the instance of the collision, thus acting upon the seat belt 9 and vehicle seat 3 by a force due to this state.

With reference to FIG. 2*b*, an increase in inclination of the cushion 5 with respect to the reclined position is disclosed as a result of the force applied, via the occupant 1 striving to continue to forward and/or via the seat belt 9 retraction, to the cushion 5 and thereby actuating the cushion adjustment means 15. Hence, the body-weight of the occupant will act with a force, due to the collision, downwards on a rear part of the cushion 5. The resulting inclination of the cushion 5, due to the actuation of the cushion adjustment means 15 will have the positive effect of restraining the hip of the occupant 1 to the seat 3 and to reduce the risk of the occupant 1 to submarine or underride the seat belt 9. The increase in inclination of the cushion 5 with respect to the reclined position may be by an angular displacement in the range from 10° to 55°, preferably from 15° to 50°, more preferably from 15° to 45°, most preferably from 15° to 40°.

In the method and arrangement 11, the inclination of at least a part of the cushion 5 may be increased with respect to the reclined position and/or the backrest 7. For example, the cushion 5 includes a front end portion and a rear end portion. The rear end portion of the cushion 5 is displaced downwards with respect to a front end portion. By way of another example, the inclination of the cushion 5 is increased by displacing the cushion 5 forward while at the same time displace the front end portion upward.

With reference to FIG. 2*c*, a forward tilting of the backrest 7 is illustrated as a result of the force transferred, via the occupant striving to move forward due to the collision, to the seat belt 9, which force will act, via the attachment point of the seat belt 9 to the backrest 7, to pull the backrest 7 forward. This will have the positive effect of adjusting the seated occupant 1 to an upright position. The angular displacement of the backrest due to the forward tilting may be in the range from 20° to 75°, preferably from 30° to 75°, more preferably from 40° to 75°, most preferably from 45° to 75°.

FIG. 2*d* illustrates the seated occupant 1 having reached the pre-determinable safety position and thus in a seating position for which airbags 21 and seat belt 9 are intended to work at their best to provide occupant protection.

The method as described herein is performed at least partly by the occupant safety arrangement 11, e. g. as described herein.

An occupant safety arrangement 11 for a vehicle seat 1 according to the present invention is described with reference to FIGS. 2*b* and 2*c*. The occupant safety arrangement 11 includes a seat belt 9, which seat belt 9 is adapted to be directly or indirectly attached to a backrest 7 of the vehicle seat 1. The occupant safety arrangement further includes a seat adjustment means 13, adapted to adjust a position of the vehicle seat 1. The seat adjustment means 13 is adapted to adjust the position of the vehicle seat 3 from a reclined position to a pre-determinable safety position. The seat adjustment means 11 is configured to be actuated by a collision force, generated by a frontal or semi-frontal collision, and applied via a seat occupant 1 and/or via the seat belt 9 to the vehicle seat 1.

The seat adjustment means 13 includes or is constituted by a passive mechanical means adapted to be actuated by an external force. An external force is generated by the vehicle being involved in a collision.

With reference to FIGS. 2b and 2c, the seat adjustment means 13 includes a cushion adjustment means 15, being adapted to adjust a position of the cushion 5, and a backrest adjustment means 17 being adapted to adjust a position of the backrest 7.

The cushion adjustment means 15 is configured to increase the inclination of at least a portion of the cushion 5 with respect to the reclined position and/or the position of the backrest 7 being actuated by the collision force applied via the seat occupant 1 to the cushion 5, see FIG. 2b.

The backrest adjustment means 17 is configured to tilt the backrest 7 forward being actuated by the collision force applied via the seat belt 9 to the backrest 7, intended to bring the seat occupant 1 to the pre-determinable safety position, as illustrated in FIG. 2c.

The cushion adjustment means 15 and the backrest adjustment means 17 of the occupant safety arrangement 11 are configured to operate or begin at least partly simultaneously and/or independently of each other, as described previously for the method.

For the occupant safety arrangement 11 as described herein, the cushion adjustment means 15 and/or the backrest adjustment means 17 may include force elements having a progressive characteristic for controlling the adjustment from the reclined position to the pre-determinable safety position, as previously described with reference to FIG. 4b.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A method for adjusting a position of a vehicle seat from a reclined position to a pre-determinable safety position, said method comprising:
   detecting an imminent or ongoing frontal or semi-frontal collision,
   pretensioning a seat belt associated with said vehicle seat, said seat belt being directly or indirectly attached to a backrest of said vehicle seat, and
   adjusting said position of said vehicle seat from said reclined position to said pre-determinable safety position by means of a seat adjustment means associated with said vehicle seat, said seat adjustment means being actuated by a collision force generated by said imminent or ongoing frontal or semi-frontal collision and applied via a seat occupant and/or said seat belt to said vehicle seat,
   wherein said pretensioning of said seat belt initiates said actuation of said seat adjustment means.

2. The method according to claim 1, wherein said seat adjustment means is a passive mechanical means adapted to be actuated by an external force.

3. The method according to claim 1, wherein said vehicle seat comprises a cushion and said backrest, said seat adjustment means comprising a cushion adjustment means being adapted to adjust a position of said cushion, and/or a backrest adjustment means being adapted to adjust a position of said backrest, said step of adjusting comprises:
   (a) increasing an inclination of at least a part of said cushion by means of said cushion adjustment means being actuated by said collision force applied via said seat occupant to said cushion, and/or
   (b) tilting said backrest forward by means of said backrest adjustment means being actuated by said collision force applied via said seat belt to said backrest.

4. The method according to claim 3, wherein step (a) comprises:
   increasing said inclination of said at least a part of said cushion with respect to said reclined position by an angular displacement in the range from 10° to 55°.

5. The method according to claim 3, wherein said cushion comprises a front end portion and a rear end portion, and step (a) comprises increasing said inclination of at least a part of said cushion by moving said rear end portion of said cushion downwards in relation to said front end portion of said cushion.

6. The method according to claim 3, wherein said cushion comprises a front end portion and a rear end portion, and wherein step (a) comprises increasing said inclination of said at least a part of said cushion by displacing said cushion forwards and said front end portion of said seat cushion upwards.

7. The method according to claim 3, wherein step (b) comprises tilting said backrest forward by an angular displacement in the range from 20° to 75°.

8. The method according to claim 3, wherein step (a) and step (b) are carried out simultaneously or independently of each other.

9. The method according to claim 1, wherein said method comprises controlling said adjustment from said reclined position to said pre-determinable safety position by means of a force element having a progressive characteristic.

10. An occupant safety arrangement for a vehicle seat, said occupant safety arrangement comprises:
    a seat belt, adapted to be directly or indirectly attached to a backrest of said vehicle seat, and
    a seat adjustment means, adapted to adjust a position of said vehicle seat, said seat adjustment means being adapted to adjust said position of said vehicle seat from a reclined position to a pre-determinable safety position, wherein said seat adjustment means is configured to be actuated by a collision force, generated by a frontal or semi-frontal collision, and applied via a seat occupant and/or via said seat belt to said vehicle seat,
    wherein pretensioning of said seat belt initiates said actuation of said seat adjustment means.

11. The occupant safety arrangement according to claim 10, wherein said seat adjustment means comprises or is constituted by a passive mechanical means adapted to be actuated by an external force.

12. The occupant safety arrangement according to claim 10, wherein said vehicle seat comprises a cushion and said backrest, and wherein said seat adjustment means comprises a cushion adjustment means, being adapted to adjust a position of said cushion, and/or a backrest adjustment means, being adapted to adjust a position of said backrest.

13. The occupant safety arrangement according to claim 12, wherein said cushion adjustment means is configured to increase the inclination of at least a part of said cushion, being actuated by said collision force applied via said seat occupant to said cushion, and/or wherein said backrest adjustment means is configured to tilt said backrest forward, being actuated by said collision force applied via said seat belt to said backrest.

14. The occupant safety arrangement according to claim 12, wherein said cushion adjustment means and said backrest adjustment means are configured to operate simultaneously or independently of each other.

* * * * *